(12) United States Patent
Lennhoff

(10) Patent No.: US 8,980,158 B2
(45) Date of Patent: Mar. 17, 2015

(54) NEAR FIELD ELECTROSPINNING SYSTEM FOR CONTINUOUS, ALIGNED FIBER TOWS

(75) Inventor: John D. Lennhoff, Andover, MA (US)

(73) Assignee: Physical Sciences, Inc., Andover, MA (US)

( * ) Notice: Subject to any disclaimer, the term of this patent is extended or adjusted under 35 U.S.C. 154(b) by 626 days.

(21) Appl. No.: 12/900,088

(22) Filed: Oct. 7, 2010

(65) Prior Publication Data

US 2012/0086154 A1    Apr. 12, 2012

(51) Int. Cl.
*D01D 5/00* (2006.01)
*B29C 47/00* (2006.01)
*D01D 5/06* (2006.01)
*D01D 5/088* (2006.01)
*D04H 3/009* (2012.01)
*D04H 3/016* (2012.01)

(52) U.S. Cl.
CPC ............... *D01D 5/0076* (2013.01); *D01D 5/06* (2013.01); *D01D 5/0885* (2013.01); *D04H 3/009* (2013.01); *D04H 3/016* (2013.01)
USPC ........................... 264/465; 264/484; 264/180

(58) Field of Classification Search
USPC ........................................................ 264/180
See application file for complete search history.

(56) References Cited

U.S. PATENT DOCUMENTS

| | | | | |
|---|---|---|---|---|
| 2,402,846 A | * | 6/1946 | Ryan ............................. | 264/180 |
| 3,219,740 A | * | 11/1965 | Hata et al. ..................... | 264/180 |
| 3,845,805 A | * | 11/1974 | Kavesh .......................... | 164/462 |
| 3,850,556 A | * | 11/1974 | Young ............................. | 425/71 |
| 3,860,379 A | * | 1/1975 | Young ............................ | 425/308 |
| RE33,492 E | * | 12/1990 | Hunke ........................... | 210/173 |
| 5,628,947 A | * | 5/1997 | Keilert .......................... | 264/143 |
| 6,039,905 A | * | 3/2000 | Zollitsch et al. .............. | 264/143 |
| 6,875,397 B2 | * | 4/2005 | Fofonoff ....................... | 264/561 |
| 8,303,288 B2 | * | 11/2012 | Huang et al. .................. | 425/66 |
| 2004/0099981 A1 | * | 5/2004 | Gerking ........................ | 264/103 |
| 2008/0296808 A1 | | 12/2008 | Joo et al. | |
| 2009/0261498 A1 | * | 10/2009 | Rheinnecker et al. ..... | 264/176.1 |
| 2010/0159050 A1 | * | 6/2010 | Huang et al. .................. | 425/68 |
| 2011/0180951 A1 | * | 7/2011 | Teo et al. ...................... | 264/109 |

FOREIGN PATENT DOCUMENTS

WO    WO 2008036051 A1 *    3/2008

OTHER PUBLICATIONS

Smit et al. Continuous yarns from electrospun fibers, Polymer, vol. 46, Issue 8, Mar. 29, 2005, pp. 2419-2423.*

Zheng et al, Precision deposition of a nanofibre by near-field electrospinning, Journal of Physics D: Applied Physics, vol. 43, No. 41, pp. 1-6, Sep. 28, 2010, doi:10.1088/0022-3727/43/41/415501.*

(Continued)

Primary Examiner — Benjamin Schiffman
(74) Attorney, Agent, or Firm — Proskauer Rose LLP

(57) ABSTRACT

A near field electrospinning system includes a spinneret that provides a plurality of fibers and a collector positioned relative to the plurality of spinnerets. The electrospinning system also includes a coagulant flowing along the collector. The coagulant is configured to receive a plurality of fibers from the spinneret(s) and move the plurality of fibers away from the spinneret(s). The electrospinning system also includes a roller configured to collect the plurality of fibers from the coagulant as a substantially untwisted bundle of continuous fibers.

15 Claims, 11 Drawing Sheets

(56) References Cited

OTHER PUBLICATIONS

Sun et al, Near-Field Electrospinning, Nano Letters, vol. 6, No. 4, pp. 839-842, Mar. 22, 2006, DOI: 10.1021/nl0602701.*
Chang et al, Continuous near-field electrospinning for large area deposition of orderly nanofiber patterns, Applied Physics Letters, vol. 93, No. 123111, Sep. 24, 2008, doi: 10.1063/1.2975834.*
Reneker, D. H., et al., "Carbon Nanofibers from Polyacrylonitrile and Mesophase Pitch," J. Adv. Materials, vol. 31, No. 1 (1999), pp. 36-41.
Reneker, D.H., et al., "Nanometre diameter fibres of polymer, produced by electrospinning," Nanotechnology, vol. 7, No. 3, Sep. 1996, pp. 216-223.
Pan, Zhi-Juan, et al., "Morphology and Mechanical Property of Electrospun PA 6/66 Copolymer Filament Constructed of Nanofibers," Journal of Fiber Bioengineering and Informatics, vol. 1, No. 1, 2008, pp. 47-54.
Tomaszewski, W., et al., "Investigation of Electrospinning with the Use of a Multi-Jet Electrospinning Head," Fibres & Textiles in Eastern Europe, vol. 13, No. 4(52), Oct./Dec. 2005, pp. 22-26.
Teo, Wee-Eong., et al., "A dynamic liquid support system for continuous electrospun yarn fabrication," Polymer 48, 2007, pp. 3400-3405.

* cited by examiner

NEAR FIELD ELECTROSPINNING SYSTEM FOR CONTINUOUS, ALIGNED FIBER TOWS

STATEMENT OF GOVERNMENT INTEREST

The subject matter described herein was developed in connection with funding provided by the Defense Advanced Research Projects Agency's Contracts Management Office ("DARPA/CMO") under Contract No. HR0011-08-C-0001. The Federal government may have rights in the technology.

FIELD OF THE INVENTION

This invention relates generally to electrospinning, and more particularly, to near field electrospinning of continuous, aligned fiber tows.

BACKGROUND OF THE INVENTION

Electrospinning is a process that can be used to form fibers, for example, polymer fibers or polyacrylonitrile ("PAN") fibers. Electrospinning systems typically include at least one spinneret, which can include a needle or array of needles, a high voltage power supply, and a collector. The spinneret can also include a syringe in which a liquid solution (e.g., a polymer solution, particulate suspension, or particulate melt) is loaded. The high voltage power supply applies an electric field between the collector and the spinneret to extract the solution from the capillary. The electric field causes a droplet of the solution to become elongated at the tip of the needle or capillary, also known as the Taylor cone. When the force from the electric field exceeds the surface tension of the liquid, a jet of charged liquid is ejected from the capillary. The liquid dries in the air and the current flow migrates to the surface of the fiber. Electrostatic repulsion due to the charged surface of the fiber causes small bends or whipping that can elongate the fiber. The fiber is then collected on a collector that is grounded to dissipate the electric charge. In some circumstances, the fibers are heated after collection or submerged in a rinse bath (e.g., alcohol) to remove residual liquid and dry the fiber.

Conventional fiber tow manufacture, for example, is limited to fibers having a diameter of about 10 microns or larger. Electrospinning produces fibers that are typically less than 10 microns and can be as small as 10 nm. The fiber tows produced by an electrospinning process results in a yarn, e.g., tows with randomly oriented fibers.

SUMMARY OF THE INVENTION

A near field electrospinning process and device can produce continuous, aligned, polymer fiber tows that have diameters of less than about 10 microns. The near field electrospinning system has at least one spinneret that is positioned above a collector. The spinneret is made of a conductive material. The spinneret can include a syringe and needle, or arrays of needles, that are used to hold a liquid solution. A high voltage power supply applies an electric field between the collector and the spinneret to extract the solution from the spinneret. The electric field causes a droplet of the solution to become elongated at the tip of the spinneret, also known as the Taylor cone. When the force from the electric field exceeds the surface tension of the liquid, a jet of charged liquid is ejected from the spinneret. The liquid evaporates from the fiber and the current flow migrates to the surface of the fiber.

In the near field electrospinning system, the collector is typically located less than about 2 cm below the spinnerets. Because of this relatively short distance, the fiber is collected on the collector before the electrostatic repulsion (e.g., from the current flow migrating to the surface of the fiber) causes small bends or whipping in the fiber. Therefore, the fiber in the near field electrospinning system is collected before this unstable, whipping state occurs. A coagulant flows along the collector and carries the fibers away from the spinnerets and towards a roller that collects the fibers as a substantially untwisted bundle of continuous fibers.

In one aspect, the invention features a near field electrospinning system including a plurality of spinnerets that provide a plurality of fibers and a collector positioned relative to the plurality of spinnerets. The electrospinning system also includes a coagulant flowing along the collector. The coagulant is configured to receive a plurality of fibers from the plurality of spinnerets and move the plurality of fibers away from the plurality of spinnerets. The electrospinning system also includes a roller configured to collect the plurality of fibers from the coagulant as a substantially untwisted bundle of continuous fibers.

In another aspect, the invention features a method of forming a substantially untwisted bundle of continuous fibers. The method includes forming a plurality of fibers by near field electrospinning and receiving the plurality of fibers in a coagulant. The method also includes flowing the coagulant to move the plurality of fibers away from the near field electrospinner. The method further includes collecting the plurality of fibers as a substantially untwisted bundle of continuous fibers.

In another aspect, the invention features a method of forming a substantially untwisted bundle of continuous fibers. The method includes a means for forming a plurality of fibers, for example, by using an electrospinning process. The method also includes a means for moving the plurality of fibers away from the means for forming the plurality of fibers, for example, with a coagulation bath. The method also includes a means for collecting the plurality of fibers as a substantially untwisted bundle of continuous fibers. The collecting means can be, for example, a collector, a substrate, or a winding drum.

In some embodiments, the collector is positioned at an incline. The collector can be positioned on an incline of about 45°. In some embodiments, the collector includes a ramp positioned relative to the plurality of spinnerets and a gutter positioned relative to the ramp. The ramp can taper towards the gutter.

In some embodiments, the near field electrospinning system further includes a container positioned relative to the gutter. The container can be configured to collect the coagulant. The system further includes a first coagulant recycle that is configured to transfer the coagulant from the container to the collector.

In some embodiments, the first coagulant recycle includes a chiller to cool the coagulant. The chiller can cool the coagulant to a temperature of about 0° C. to about room temperature or about 25° C. In some embodiments, the chiller can cool the coagulant to about 5° C.

The near field electrospinning system can further include a container positioned relative to the gutter. The container can be configured to collect the coagulant. The system can further include a second coagulant recycle that is configured to transfer the coagulant from the container to the gutter. The system can also include a heater to heat the second coagulant recycle. In some embodiments, the heater heats the coagulant to a temperature of about room temperature, or about 25° C., to about 80° C. In some embodiments, the heater heats the coagulant to a temperature of about 75° C.

In some embodiments, the plurality of spinnerets forms at least one array that comprises about 50 to about 1,000 spinnerets.

The near field electrospinning system can further include a lower gutter positioned below the gutter. The system can also include a screen positioned in the gutter. The screen can be configured to allow the coagulant to flow from the gutter to the lower gutter.

In some embodiments, the fibers are PAN nanofibers.

The coagulant flow can have a Reynolds number of about $1\times10^4$ to about $1\times10^6$. In some embodiments, the coagulant flows along the collector at a rate of about 0.1 m/s to about 10 m/s.

In some embodiments, the coagulant can be collected and/or recycled. The coagulant can be cooled in a region where the plurality of fibers is received. In some embodiments, the plurality of fibers can be rinsed.

Other aspects and advantages of the invention will become apparent from the following drawings and description, all of which illustrate principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1:
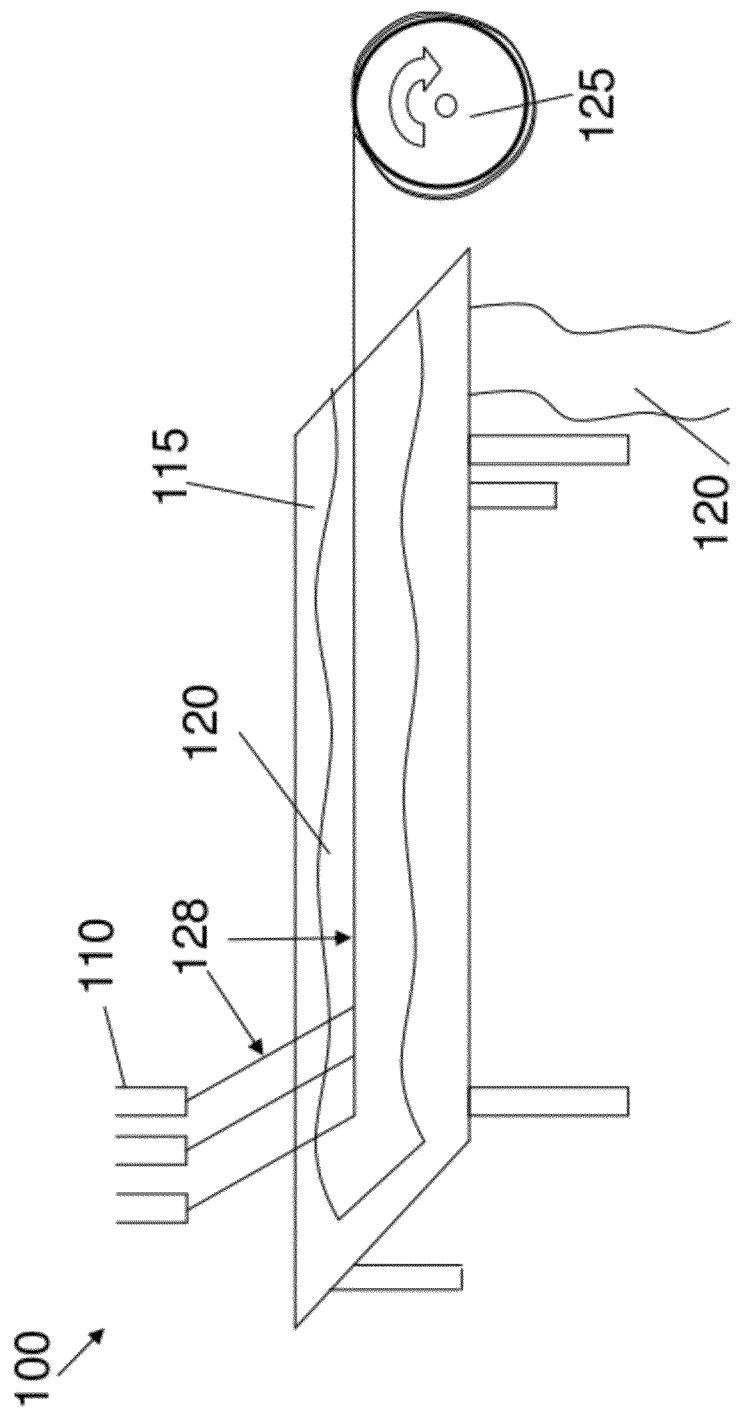
FIG. 1 is a schematic illustration of a near field electrospinning system, according to an illustrative embodiment of the invention.

FIG. 1 shows a near field electrospinning system 100, according to an illustrative embodiment of the invention. The near field electrospinning system 100 can produce continuous, aligned, polymer fiber tows. The polymer fibers can have a diameter of less than about 10 microns.

The near field electrospinning system 100 includes a plurality of spinnerets 110, a collector 115, a coagulant 120 flowing along the collector 115, and a roller 125. The plurality of spinnerets 110 can provide a plurality of fibers 128. The collector 115 is positioned relative to the plurality of spinnerets 110. The coagulant 120 is configured to receive the plurality of fibers 128 from the plurality of spinnerets 110. The coagulant 120 moves the plurality of fibers 128 away from the plurality of spinnerets 110. The roller 125 is configured to collect the plurality of fibers 105 from the coagulant 120. The fibers 105 are collected as a substantially untwisted bundle of continuous fibers.

Figure 2:
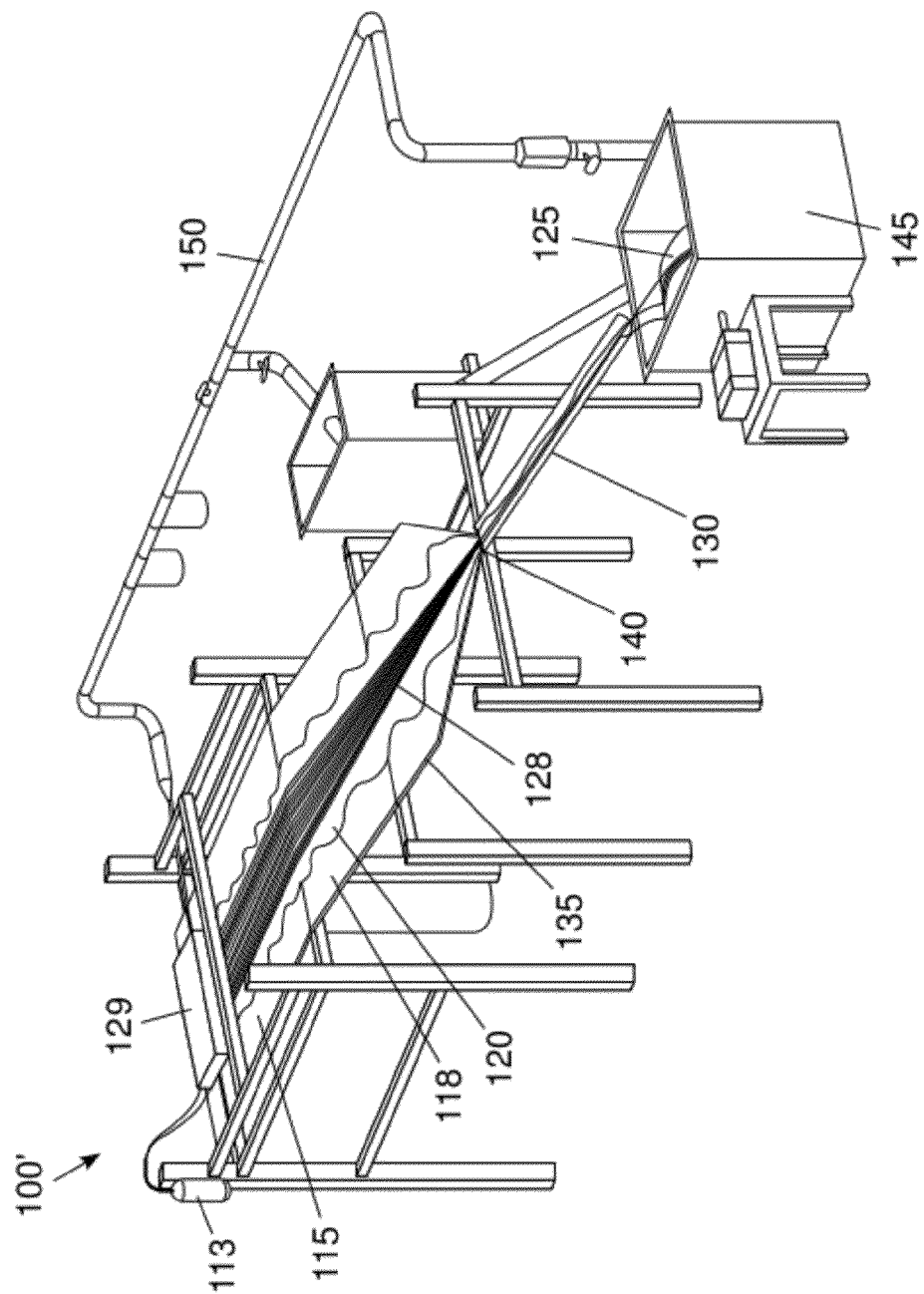
FIG. 2 is a schematic illustration of a near field electrospinning system, according to an illustrative embodiment of the invention.

FIG. 2 shows another embodiment of a near field electrospinning system 100'. The plurality of spinnerets can form part of an array 129. In some embodiments, the spinnerets 110 form at least one array 129, which comprises about 50 to about 1,000 spinnerets. Multiple spinneret arrays can be used.

Although the term spinneret is used throughout this application, the term spinneret can be used interchangeably with the terms electrode and needle. In some embodiments, the spinneret is a needle with a syringe. The syringe can be filled with a polymer melt, for example. When an electric field is applied, the polymer melt and fibers are extracted through the needle. In some embodiments, the fibers are PAN nanofibers. In addition to PAN nanofibers, a wide range of solutions or melt processable polymers can be used, including, for example, polyamide (e.g., nylon), polyester, and polyolefin.

Each spinneret within the array 129 can produce a single fiber. When the fibers from multiple spinnerets are combined together, a tow is formed. For example, about 50 to about 1000 fibers can be combined to form a tow. In some embodiments, about 20 fibers can be combined together to form a tow. In some embodiments more than 1,000 fibers can be combined together to form a tow. The substantially untwisted bundle of continuous fibers that are collected using the near field electrospinning apparatus described herein, can be collected with the fibers in parallel alignment without any substantial twisting or braiding. Multiple substantially untwisted bundles of continuous fibers can be braided together to produce a thread.

The collector 115 can be positioned below the spinneret array 129 to collect the plurality of fibers 105. In some embodiments the collector 115 is positioned at an incline. The incline can be from about 10° to about 60°, although larger or smaller angles can be used depending on the application. In one embodiment, the incline is about 45°.

In some embodiments, the electrospinning system 100 includes a power supply 113 that can apply an electric field between the collector 115 and the spinneret array 129 to extract the solution from the spinneret array 129 and form fibers.

The distance between a spinneret and the collector 115 can vary depending on the specific application. For example, the collector 115 can be positioned about 1 mm to about 2 cm below the spinnerets 110. The position of the collector 115 relative to spinnerets 110 can be based on when the unstable portion of the fiber occurs (e.g., when the fiber begins to bend or whip due to the electrostatic repulsions on the charged surface of the fiber). For example, when an electric field is applied between the spinneret 110 and the collector 115, a droplet of the solution in the syringe becomes elongated at the tip of the needle or capillary. When the force from the electric field exceeds the surface tension of the liquid, a jet of charged liquid is ejected from the capillary. The liquid dries in the air and the current flow migrates to the surface of the fiber. When the distance between the spinnerets 110 and the collector 115 is large, for example, greater than about 2 cm, electrostatic repulsion due to the charged surface of the fiber can cause small bends or whipping that can elongate the fiber. However, when the distance between the spinnerets 110 and the collector 115 is small (e.g., less than about 2 cm), the fiber reaches the collector 115 before the whipping, or unstable portion, of the fiber occurs.

The coagulant 120 can act as a flowing conveyor belt to transfer the plurality of fibers 128 away from the spinnerets 110. For example, when the collector 115 is positioned at an incline, gravity forces the coagulant 120, and thus the plurality of fibers 128, to move away from the plurality of spinnerets 110 or spinneret array 129.

The coagulant 120 can be water, an organic solvent, DMF, isopropyl alcohol ("IPA"), acetone, or any combination thereof. For example, the coagulant can be 10% acetone, 35% DMF and 55% water at 5° C. Table 1 shows examples of coagulant compositions.

TABLE 1

| Solvent 1 | | Solvent 2 | | Solvent 3 | |
|---|---|---|---|---|---|
| water | 100% | 0% | | 0% | |
| water | 100-10% | DMF | 90% to 0% | 0% | |
| water | 100-10% | DMF | 90% to 0% | IPA | 0-20% |
| water | 100-10% | DMF | 90% to 0% | acetone | 0-20% |

Figure 3:
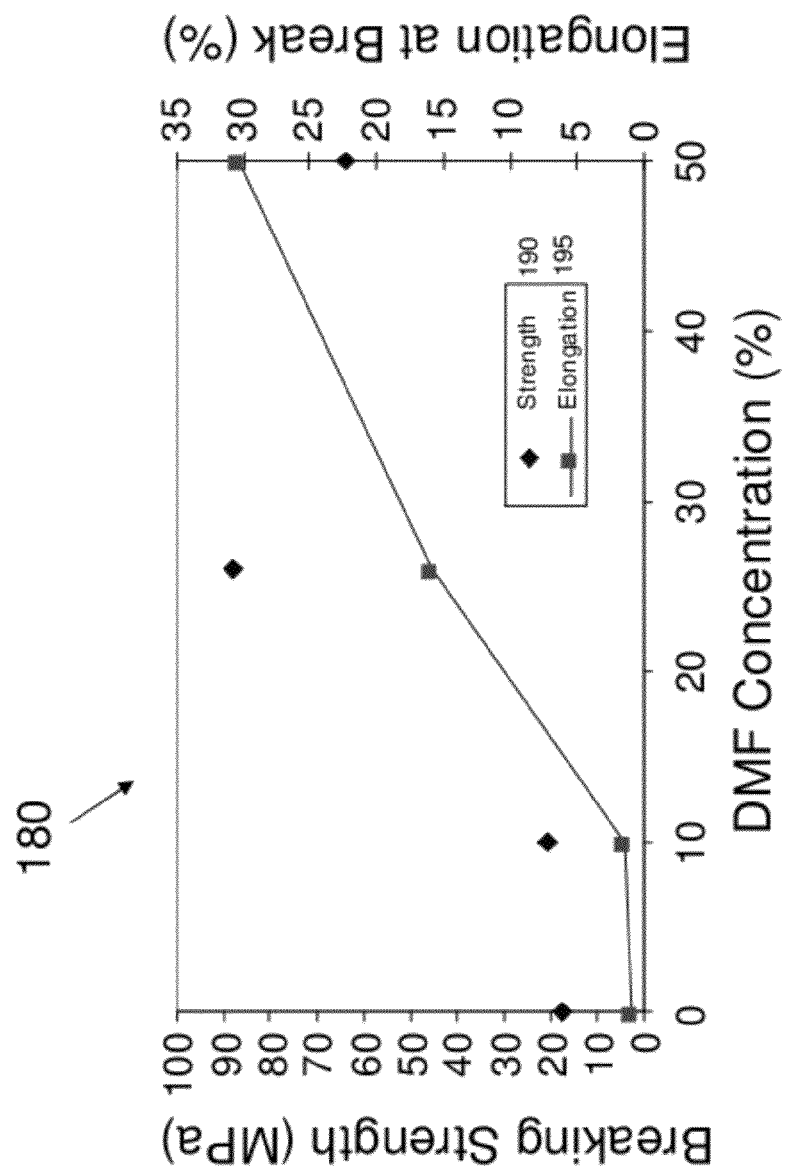
FIG. 3 is a graph of the breaking strength and the percent of elongation at break of the PAN fiber versus the dimethyl formamide ("DMF") concentration.

The coagulant, or the concentration of the coagulant, can have an affect on both the breaking strength of the fiber and the percent of elongation of the fiber at the breaking point. FIG. 3 shows a graph 180 of the breaking strength and the percent of elongation of the fiber at break versus the DMF concentration. The breaking strength 190 of the fiber increases as the DMF concentration of the coagulant increases from 0% to about 30%. The breaking strength 190 of the fiber decreases from about 30% to about 50% DMF of the coagulant. Similarly, the percent elongation 195 at break of the fiber increases as the DMF concentration increases from about 0% to about 50%. The solvent concentrations within the coagulant can maximize both the strength 190 of the fiber and the percent elongation 195 of the fiber at the breaking point.

Referring to FIGS. 1 and 2, the incline of the collector 115 can determine the rate at which the coagulant 120 flows away from the plurality of spinnerets or spinneret array 129. A shallow incline, for example, about 10°, results in a slower rate of coagulant flow then a steeper incline, for example, about 60°. In some embodiments, the coagulant flows along the collector at a rate of about 0.1 m/s to about 10 m/s.

The coagulant flow can have a Reynolds number of about $1 \times 10^4$ to about $1 \times 10^6$. The Reynolds number is an indication of whether the coagulant flow is laminar or turbulent and is dependent on the fluid velocity of the coagulant. Turbulent coagulant flow is typically avoided because the turbulent flow can tangle or break the fibers. Laminar flow is used to provide a steady controlled flow of the coagulant. Laminar flow can allow for controlled management of the fibers flowing in the coagulant so that the fibers are maintained in parallel alignment without breaking.

The roller 125 can be a rotating mandrel. The roller 125 can rotate at a rate of about 6 msec. In some embodiments, the roller 125 has both a rotational speed and a lateral movement that is used to wind the fibers 128. The lateral movement can allow the fibers to be wound along the length of the roller 125. For example, the roller 125 can have a wind pattern of about 9 rotations for every lateral movement across the roller 125.

In some embodiments the collector 115 includes a ramp 118 that is positioned relative to the spinneret array 129. The ramp 118 can be positioned at varying inclines, for example between about 10° to about 60°. In some embodiments, the ramp 118 is positioned between the collector 115 and the roller 125. The ramp 118 and the collector 115 can both be positioned at inclines. For example, the collector 115 can be positioned at a shallower incline than the ramp 118. In some embodiments, the incline of the collector 115 is about two thirds to about one third of the incline of the ramp 118. In some embodiments, the collector 115 and the ramp 118 are positioned at the same incline. The collector 115 can also be positioned at a steeper incline than the ramp 118.

The ramp 118 and the collector 115 can be about 1 ft to about 10 ft wide. In some embodiments, the ramp 118 and the collector 115 are about 2 ft to about 3 ft wide. The ramp 118 and the collector 115 can have the same width, or the ramp and the collector can have different widths.

The electrospinning system 100' includes a gutter 130 positioned relative to the ramp 118. In some embodiments, the gutter 130 is positioned between the ramp 118 and the roller 125. In some embodiments, the gutter 130 and ramp 118 have the same width. The ramp 118 can have a first width 135 and a second width 140. The first width 135 can be greater than the second width 140. In some embodiments, the second width 140 can be the same as the width of the gutter 130. The ramp 118 can taper from the first width 135 to the second width 140 as the ramp 118 approaches the gutter 130.

In some embodiments, the collector 115, the ramp 118 and/or the gutter 130 have a means for maintaining the coagulant 120 on the collector 115, ramp 118 and/or gutter 130, respectively. In some embodiments, the collector 115, the ramp 118, and the gutter 130 have the same means for maintaining the coagulant 120 within the electrospinning system 100'. The collector 115, the ramp 118, and the gutter 130 can have different means for maintaining the coagulant 120 within the electrospinning system 100'. For example, the edges of the collector 115, ramp 118 and/or gutter 130 can be raised so that the coagulant 120 flows from the collector 115 to the roller 125 without being lost to the surrounding environment. In some embodiments, the collector 115, ramp 118 and/or gutter 130 have groove around the outer perimeter to maintain the coagulant 120 within the electrospinning system 100'.

The flow of the coagulant 120 can decrease in the area where the ramp 118 meets the gutter 130, particularly, if the ramp 118 tapers towards the gutter 130. This can cause the coagulant 120 to pool at the location where the ramp 118 meets the gutter 130 or flow upstream, e.g., towards the spinneret array 129 instead of towards the roller 125. To prevent the flow reversal and/or pooling of the coagulant 120, the gutter 130 can include means (e.g., a groove around the perimeter of the gutter 130 or holes through the bottom of the gutter 130) to allow a portion of the coagulant 120 to exit the gutter 130 prior to the roller 125.

The electrospinning system 100' includes a container 145 positioned relative to the gutter 130. The container 145 can be configured to collect the coagulant 120 after the coagulant has moved the plurality of fibers through the electrospinning system 100'. In addition, the electrospinning system 100' includes a recycle 150, for example, a first coagulant recycle, which is configured to transfer the coagulant 120 from the container 145 to the collector 115 and/or the ramp 118.

Figure 4:
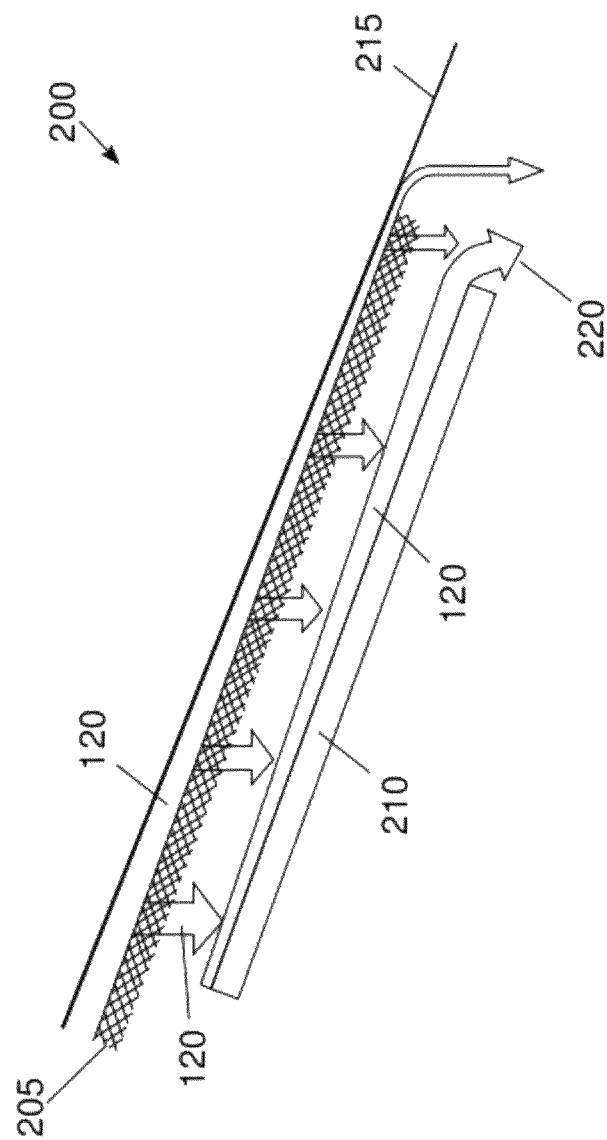
FIG. 4 is a side view of a coagulation bath split mechanism, according to an illustrative embodiment of the invention.

FIG. 4 is a side view of a coagulation bath split mechanism 200, according to an illustrative embodiment of the invention. The mechanism 200 includes a screen 205 positioned in a gutter (not shown) and a lower gutter 210 positioned below the screen 205. The mechanism 200 can be positioned in gutter 130 as shown in FIG. 2. The coagulant 120 flows from a ramp, for example, ramp 118 of FIG. 2, down the gutter, for example the gutter 130 of FIG. 2. The screen 205 can allow the coagulant 120 to flow from the gutter to a lower gutter 210. The lower gutter 210 can be positioned below the gutter or the screen 205. In some embodiments, the screen 205 replaces the gutter. In other embodiments, the gutter includes apertures or holes that allow the coagulant 120 to flow from the gutter to the lower gutter 210.

The screen 205 can be made of brass and is configured to allow a portion of the coagulant 120 to flow through the screen 205 to the lower gutter 210. The coagulant 120 that does not flow through the screen 205 flows with the fiber tow 215 to the roller 125. The depth of the coagulant 120 decreases across the length of the gutter and/or screen 205. When the coagulant 120 reaches the end 220 of the gutter, screen 205, and/or lower gutter 210, the coagulant 120 can be collected and/or recycled.

In some embodiments, the coagulation bath split mechanism 200 can be used to transfer the fiber tow from the initial coagulant to a rinse bath without cross-contamination of the coagulant and rinse bath. Contamination of a coagulant, for example DMF and water, with a rinse bath, for example, water, can complicate processing and waste stream handling. Moreover, each fluid, the coagulant and rinse bath can be recycled separately. The tow transfer can be made across the baths without breaking the tow. For example, the screen 205 can have about a 20% open area to divert the coagulant 120 to a lower gutter 210 below the screen 205. The tow remains in the flow retained in the screen stream. The tow can then be transferred to a rinse bath (not shown) with a minimum flow transfer. In some embodiments, about 90% of the flow of the coagulant 120 is diverted to the lower gutter 210.

A surface agent can be added to the coagulant to impact the surface tension and wettability of the coagulant. A lower surface tension of the coagulant allows the fiber to immerse almost immediately into the coagulant without stretching. The addition of an alcohol based solvent to the coagulant also enhances wettability of the coagulant on the ramp and in the gutter segments of the process. The addition of the alcohol enhances fiber uniformity and process stability.

Figure 5:
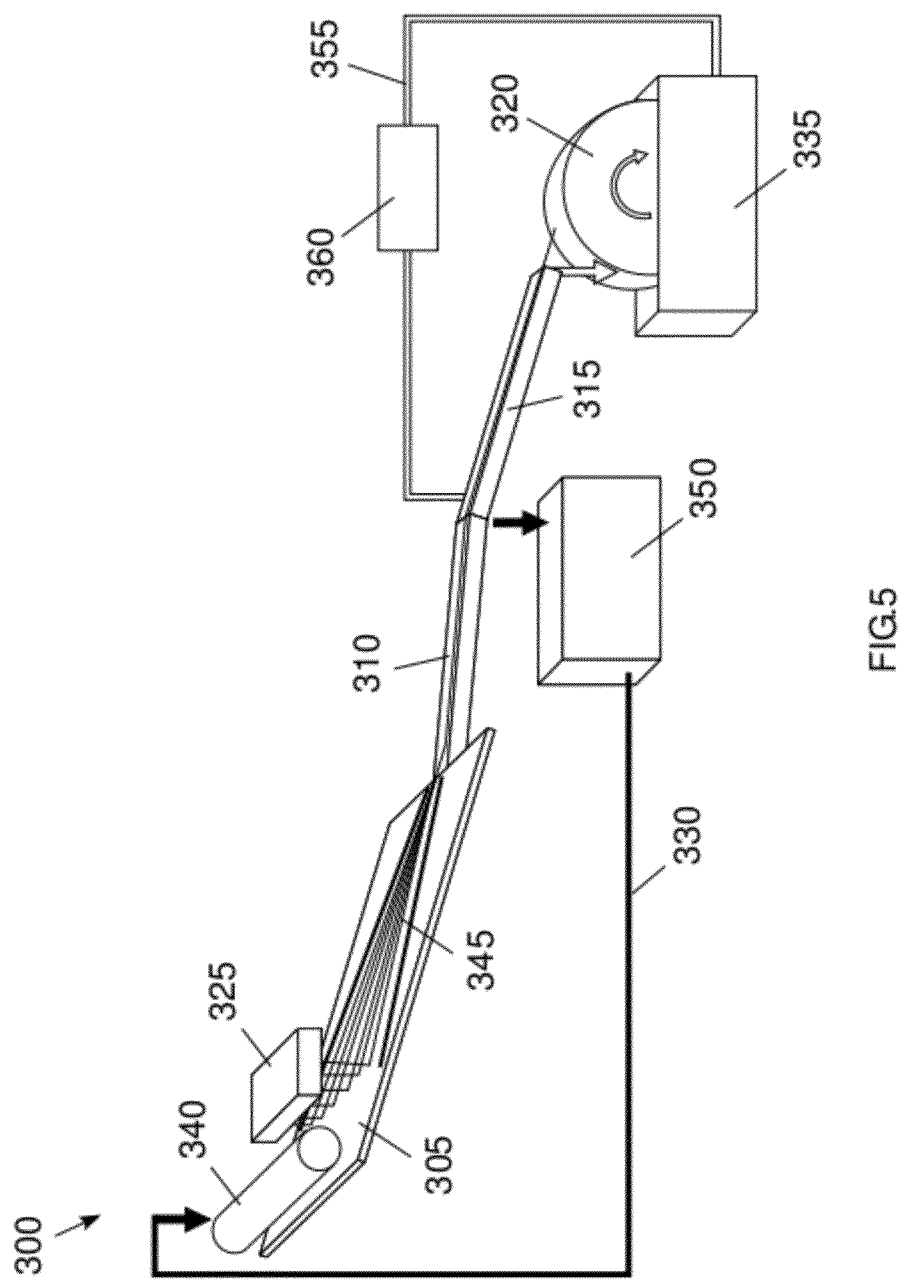
FIG. 5 is a schematic illustration of coagulation recycle of a near field electrospinning system, according to an illustrative embodiment of the invention.

FIG. 5 illustrates a coagulation recycle of a near field electrospinning system 300, according to an illustrative embodiment of the invention. The electrospinning system 300 includes a collector 305, a ramp 310, a gutter 315, a roller 320, and a spinneret array 325 that comprises a plurality of spinnerets. The electrospinning system 300 can include two coagulant recycles. A first coagulant recycle 330 can transfer the coagulant from the container 335 to the collector 305 (or, for example, the recycle 150 can transfer the coagulant from the container 145 to the collector 115 of FIG. 1).

In some embodiments, the first coagulant recycle 330 includes a chiller 350 to cool the coagulant before the coagulant is transferred to collector 305. The chiller 350, for example a heat exchanger, can cool the coagulant to a temperature of about 0° C. to about room temperature or about 25° C. The coagulant is cooled to slow down the diffusion of the solvent from the fiber to the coagulant. Slow solvent diffusion from the fiber results in a fiber of high density which correlates with high strength.

The coagulant can be distributed on the collector 305 by a coagulant feed 340. The coagulant feed 340 can distribute the coagulant evenly along the width of the collector 305. An even distribution of coagulant across the width of the collector 305 is beneficial to maintain the plurality of fibers 345 in the coagulant and to allow the coagulant to transfer the plurality of fibers 345 from the collector 305 to the roller 320.

In some embodiments, the electrospinning system 300 includes a second coagulant recycle 355 that is configured to transfer the coagulant from the container 335 to the gutter 315. The second coagulant recycle 355 can also include a heater 360, for example, a heat exchanger, which can heat the second coagulant recycle 355. In some embodiments, the heater 360 heats the coagulant to a temperature of about room temperature, or about 25° C., to about 80° C. This heated rinse removes residual solvent from the fiber so that the solvent won't vaporize when the fiber is dried. If the solvent vaporizes while fiber dries, the fiber can crack or develop voids.

Figure 6:
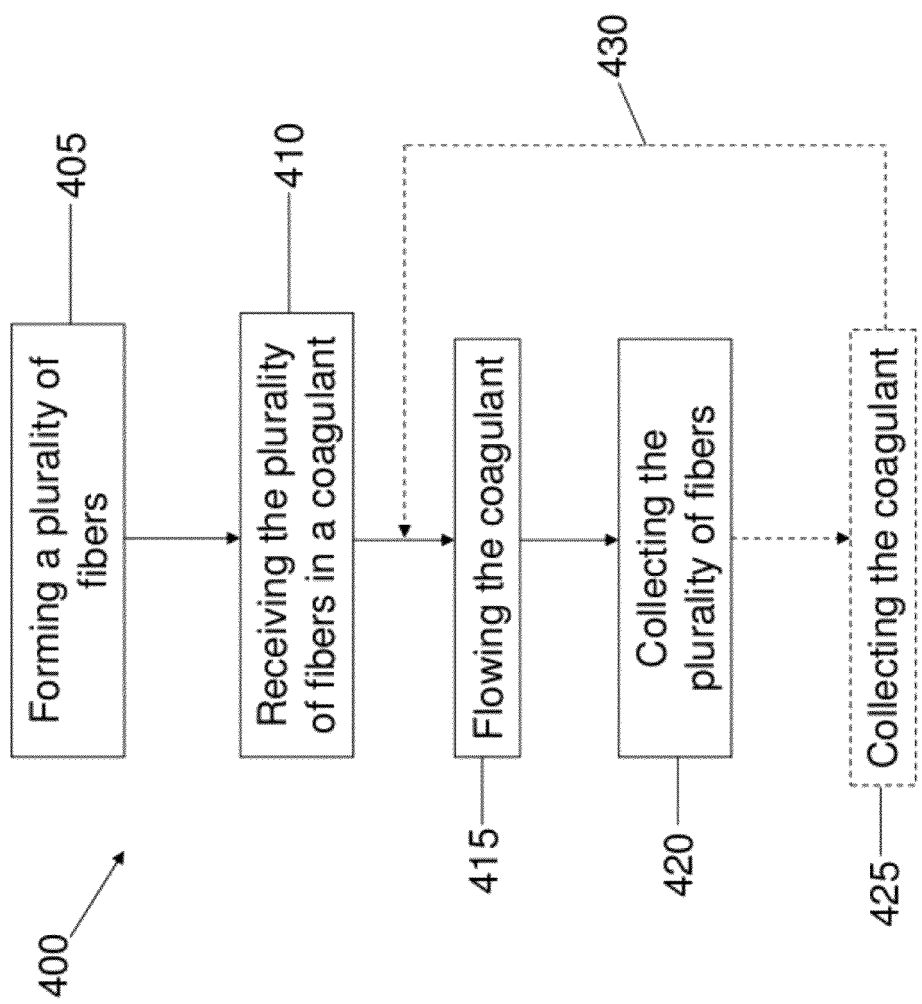
FIG. 6 is a flow chart of a method of forming a substantially untwisted bundle of continuous fibers, according to an illustrative embodiment of the invention.

FIG. 6 is a flow chart of a process 400 for forming a substantially untwisted bundle of continuous fibers, according to an illustrative embodiment of the invention. A plurality of fibers is formed by near field electrospinning (step 405). The plurality of fibers is received in a coagulant (step 410). The coagulant is flowed (step 415) to move the plurality of fibers away from the near field electrospinner. The plurality of fibers are collected (step 420) as a substantially untwisted bundle of continuous fibers.

In some embodiments, the process includes collecting the coagulant (step 425) after the plurality of fibers is collected (step 420). The coagulant can then be recycled (430). The coagulant can be recycled at various points throughout the electrospinning system. For example, the coagulant can be recycled to the beginning of the process where the coagulant is initially dispersed, or the coagulant can be recycled at any point along the path the coagulant flows to move the plurality of fibers away from the near field electrospinner.

In some embodiments, the process 400 includes cooling the coagulant in a region where the plurality of fibers is received. The process 400 can also include heating the coagulant at a region along the path the coagulant flows.

The process 400 can also include rinsing the plurality of fibers. The rinse can cleanse the plurality of fibers from any contaminates that may have accumulated on the plurality of fibers during the electrospinning process. The rinse can also remove the remaining coagulant from the plurality of fibers.

Figure 7B:
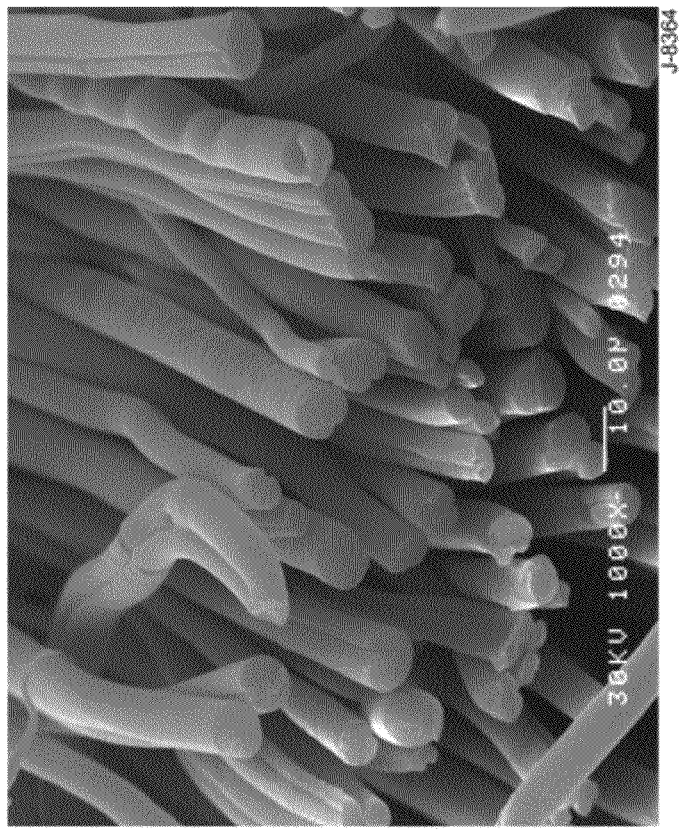
FIG. 7B is a 1000× SEM image of a substantially untwisted bundle of continuous fibers.
Figure 7A:
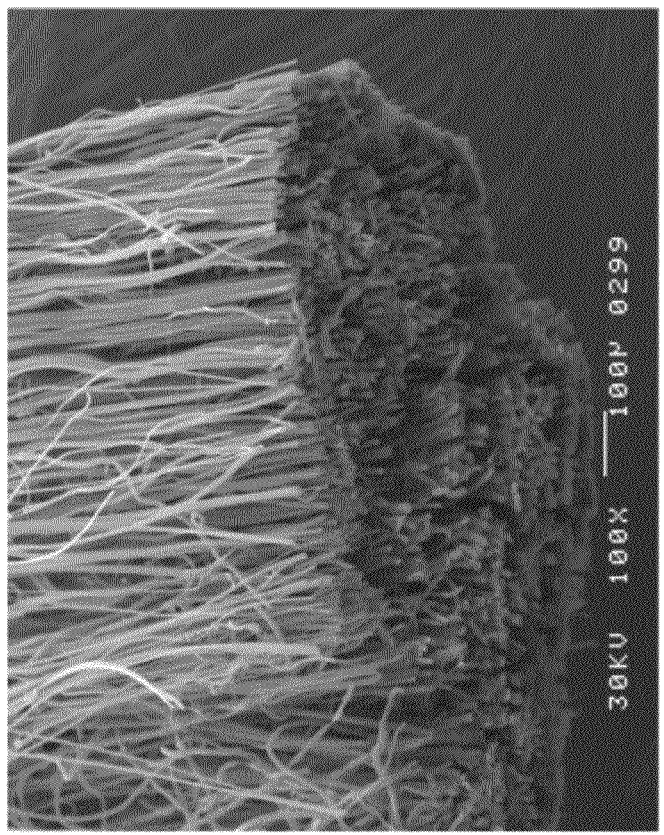
FIG. 7A is a 100× scanning electron microscope (SEM) image of a substantially untwisted bundle of continuous fibers.

FIG. 7A is a 100× SEM image 500 of a substantially untwisted bundle of continuous fibers. FIG. 7B is a 1000× SEM image 550 of a substantially untwisted bundle of continuous fibers. The SEM images 500 and 550 show an approximately 3 micron diameter fiber tow. The tow filaments are substantially parallel and this particular alignment is due to the operation of the process with a multiple nozzle and high coagulation bath velocity to minimize the filament entanglement. The residual solvent (e.g., coagulant) was very low, e.g., below about 100 ppm as measured by gas chromatography and mass spectroscopy. The 3 micron diameter fiber tow show in FIGS. 7A and 7B provided ox-load of about 0.22 g/de and about 188% elongation. The room temperature tensile strength is about 120 MPa and about 70% elongation. An aligned, 1 m long tow can be fabricated with diameters of about 3, 5, and 9 microns and densities of about 400 mg/m. A tow of up to about 5 km can be fabricated with a linear density of less than about 1 mg/m.

To obtain the approximately 3 micron diameter fiber tow, an electrospinning nozzle array can be composed of multiple blunt tip syringe style needles secured to an aluminum manifold. The flow of PAN polymer to the electrospinning nozzles can be controlled using, for example, Argon gas pressure or a series of syringe pumps. The syringe pumps provide the ability to accurately meter the polymer flow, while the gas pressure provides a more approximate meter of the polymer flow. An 8 or 10 nozzle array can be used (with a 1 in. separation between nozzles) at a separation distance of 2 cm from the nozzle tips to the water surface for production of 3 micron diameter fibers (from 15% PAN/DMF).

Figure 8:
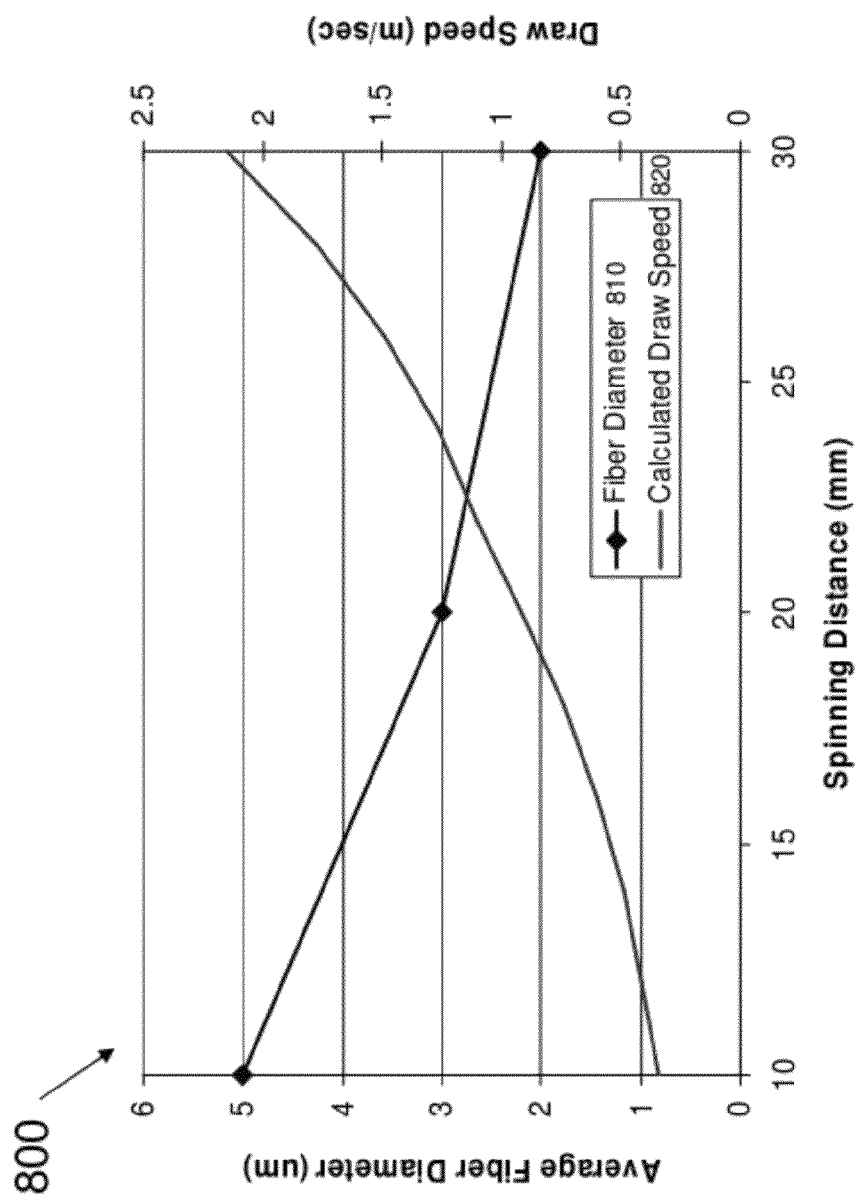
FIG. 8 is a graph of fiber diameter as a function of spinning distance with calculated fiber velocity.

The fiber velocity can be calculated from the measured fiber diameter as a function of standoff position of the nozzle tip to the coagulant bath flow. FIG. 8 is a graph 800 of fiber diameter 810 as a function of spinning distance with calculated fiber velocity 820. As shown in FIG. 8, the fiber diameter 810 decreases as the standoff position of the nozzle tip to the coagulant bath flow increases. In addition, the calculated draw speed 820 increases as the standoff position of the nozzle tip to the coagulant bath flow increases. Moreover, to obtain a smaller fiber diameter 810, the calculated fiber velocity 820 can be increased.

The data in FIG. 8 was used to ensure the coagulation bath flow was fast enough to keep the fiber in tension during travel through the downstream process. The data also confirms flow calculations and literature estimates of near field electrospinning velocities.

Figure 9:
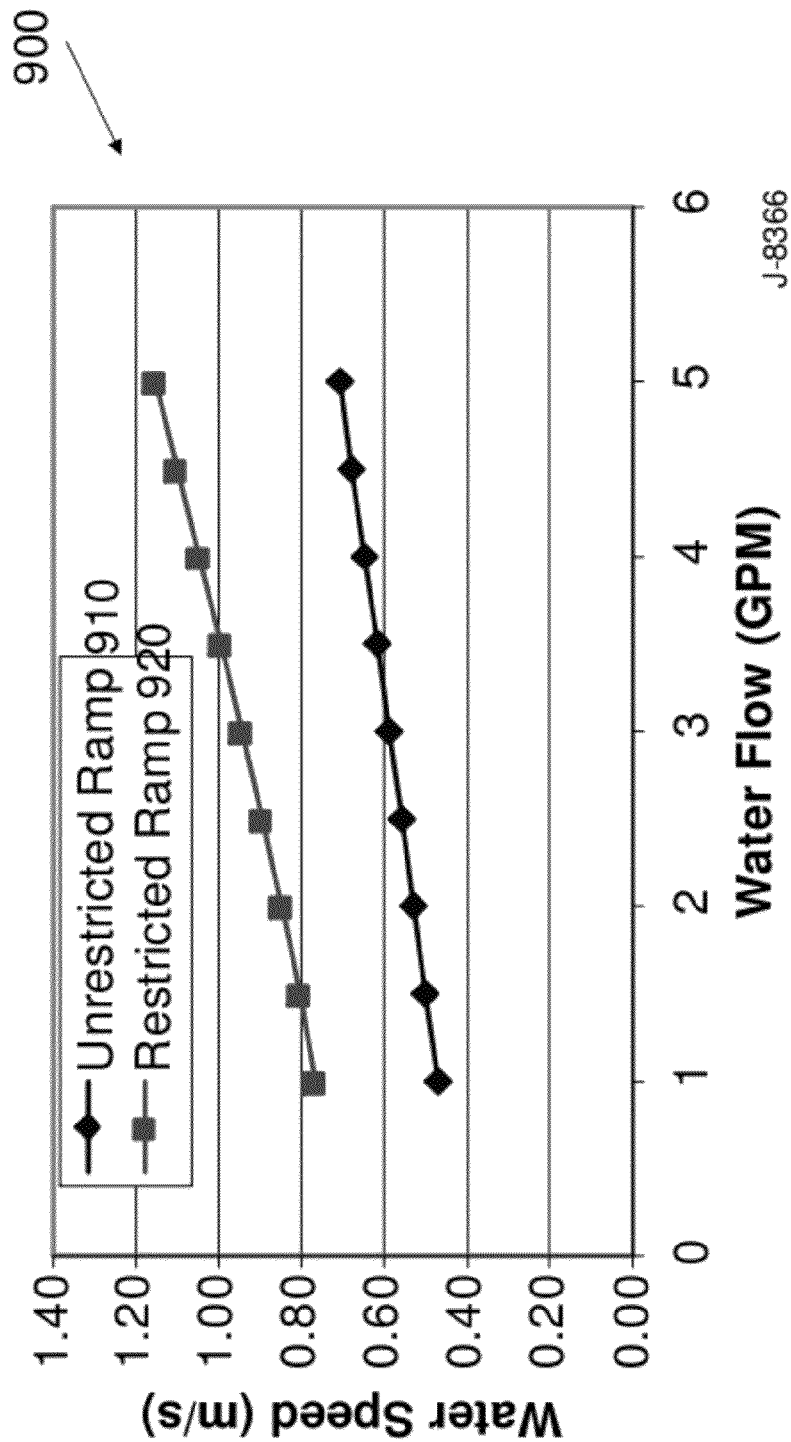
FIG. 9 is a graph of water speed versus water flow for an unrestricted and restricted ramp.
Figure 10:
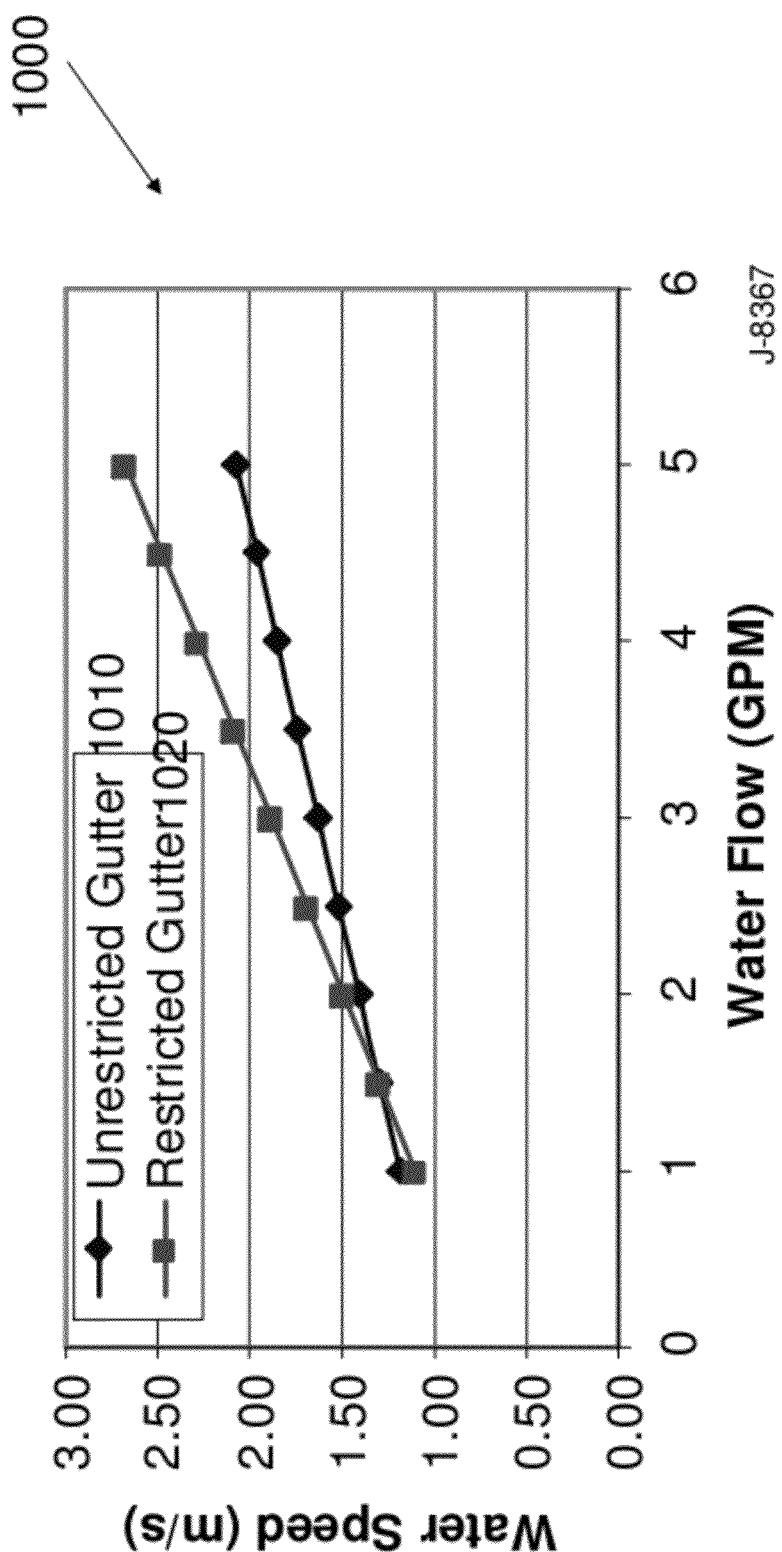
FIG. 10 is a graph of water speed versus water flow for an unrestricted and restricted gutter.

The process ramp and gutter coagulation bath velocity can be measured as a function of coagulant flow rate. FIG. 9 is a graph 900 of water speed versus water flow for an unrestricted ramp 910 and restricted ramp 920 and FIG. 10 is a graph 1000 of water speed versus water flow for an unrestricted gutter 1010 and restricted gutter 1020. FIGS. 9 and 10 provide a correlation for the coagulation surface velocity and the coagulant bath flow rate. The coagulation bath enters the ramp through an opening (about 15 in. wide) across the ramp above the electrospinning head. As the coagulant flows down the ramp, it can be restricted by sidewalls, or allowed to flow freely to the gutter. The flow is channeled from about 15 in. wide down to about a 2 in. wide flow in the gutter. The shape of the restriction can be controlled. Once in the gutter, the flow cross-section is narrowed further and the flow velocity speeds up. The tow alignment can be dependant upon the flow velocity and the flow velocity can exceed the nanofiber ejection velocity (about 1 m/s) from the nozzle to the flow below (on the ramp).

The electrospun fiber tow can be collected on a take-up drum spinning at a rotational velocity matched to the fiber production rate. The tow take-up velocity can be higher than the fiber production rate to stretch and align the nanofibers. There is a space between the gutter and the drum where the coagulant flow is diverted downward and the tow is collected on the drum. Tows with as few as eight, 3 micron diameter filaments can be continuously collected on the take-up drum.

Figure 11:
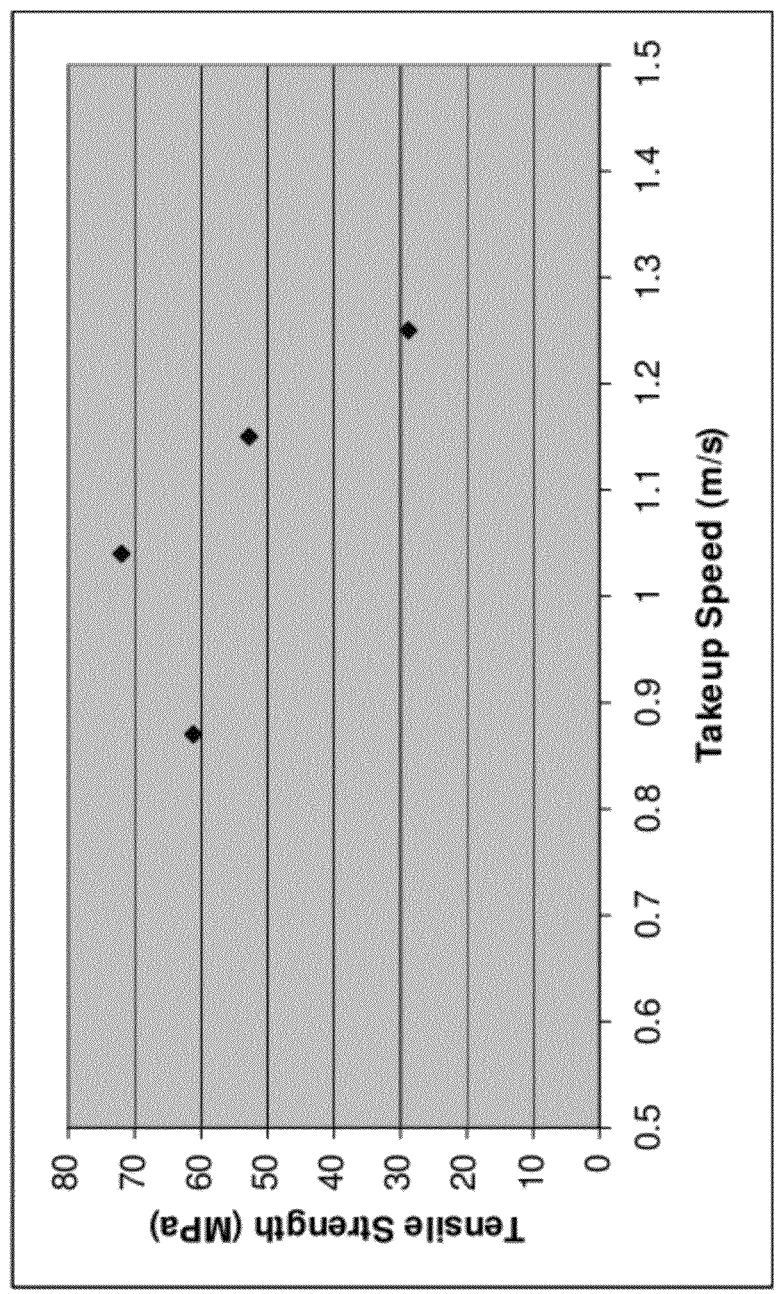
FIG. 11 is a graph of tow strength as a function of take-up velocity

The tow strength can be measured as a function of take-up drum rotation speed, for steady electrospinning and coagulation conditions. As the tow is stretched during take-up, the fibers better align within the tow and the individual filaments are stretched to better align the polymer chains. Both of these effects can increase tow strength. FIG. 11 is a graph 1100 of tow strength as a function of take-up velocity. As shown in FIG. 11, the maximum tow strength is at a take-up speed of about 1.1 m/s, indicating that the filaments in the tow are breaking or the stretching is weakening the tow.

A rinse step can be performed either after the tow is wound on the drum or while the tow is being wound on the drum. Pure hot water can be used to rinse the tow. Rinse temperatures can range from about room temperature, or about 25° C. to about 85° C. Rinsing can be accompanied by fiber tow stretching up to four times. Stretching can be accomplished by controlling the rotation speed of the take-up reel speed.

One skilled in the art will realize the invention may be embodied in other specific forms without departing from the spirit or essential characteristics thereof. The foregoing embodiments are, therefore, to be considered in all respects illustrative rather than limiting of the invention described herein. Scope of the invention is thus indicated by the appended claims, rather than by the foregoing description, and all changes that come within the meaning and range of equivalency of the claims are, therefore, intended to be embraced therein.

What is claimed is:

1. A near field electrospinning system comprising:
   one or more spinnerets configured to produce a plurality of fibers;
   a collector positioned relative to the spinnerets within the near field and configured to receive the fibers produced by the spinnerets such that the fibers are not whipped prior to receipt by the collector;
   a coagulant flowing laminarly along the collector, the coagulant configured to receive the fibers from the spinnerets and move the fibers away from the spinnerets; and
   a roller configured to collect the fibers from the coagulant as a substantially untwisted bundle of continuous fibers.

2. The near field electrospinning system of claim 1 wherein the collector is positioned at an incline.

3. The near field electrospinning system of claim 1 wherein the incline is about 45°.

4. The near field electrospinning system of claim 1 wherein the collector comprises a ramp positioned relative to the spinnerets and a gutter positioned relative to the ramp.

5. The near field electrospinning system of claim 4 wherein the ramp tapers towards the gutter.

6. The near field electrospinning system of claim 4 further comprising:
   a container positioned relative to the gutter, the container configured to collect the coagulant; and
   a first coagulant recycle configured to transfer the coagulant from the container to the collector.

7. The near field electrospinning system of claim 6 wherein the first coagulant recycle comprises a chiller to cool the coagulant.

8. The near field electrospinning system of claim 7 wherein the chiller cools the coagulant to a temperature of about 5° C.

9. The near field electrospinning system of claim 4 further comprising:
   a container positioned relative to the gutter, the container configured to collect the coagulant;
   a second coagulant recycle configured to transfer the coagulant from the container to the gutter; and
   a heater to heat the second coagulant recycle.

10. The near field electrospinning system of claim 9 wherein the heater heats the coagulant to a temperature of about 75° C.

11. The near field electrospinning system of claim 4 further comprising:
   a lower gutter positioned below the gutter; and
   a screen positioned in the gutter, the screen configured to allow the coagulant to flow from the gutter to the lower gutter.

12. The near field electrospinning system of claim 1 wherein the spinnerets form at least one array that comprises about 50 to about 1,000 spinnerets.

13. The near field electrospinning system of claim 1 wherein the fibers are polyacrylonitrile nanofibers.

14. The near field electrospinning system of claim 1 wherein the coagulant flow has a Reynolds number of about $1 \times 10^4$ to about $1 \times 10^6$.

15. The near field electrospinning system of claim 1 wherein the coagulant flows along the collector at a rate of about 0.1 m/s to about 10 m/s.

\* \* \* \* \*